(12) United States Patent
Bradley et al.

(10) Patent No.: US 7,778,511 B1
(45) Date of Patent: Aug. 17, 2010

(54) OPTICAL FIBER CABLES

(75) Inventors: Kelvin B. Bradley, Lawrenceville, GA (US); Peter A. Weimann, Atlanta, GA (US)

(73) Assignee: OFS Fitel LLC, Norcross, GA (US)

( * ) Notice: Subject to any disclaimer, the term of this patent is extended or adjusted under 35 U.S.C. 154(b) by 0 days.

(21) Appl. No.: 12/456,448

(22) Filed: Jun. 17, 2009

(51) Int. Cl.
   *G02B 6/44* (2006.01)
(52) U.S. Cl. .................. 385/102; 385/53; 385/100
(58) Field of Classification Search .................. 385/53, 385/56, 58, 76, 77, 78, 85, 100, 102, 105, 385/106, 107, 110, 111, 112, 113, 126, 127, 385/147
   See application file for complete search history.

(56) References Cited

U.S. PATENT DOCUMENTS

| | | | | |
|---|---|---|---|---|
| 5,133,034 A | * | 7/1992 | Arroyo et al. | 385/107 |
| 5,293,442 A | * | 3/1994 | Sayegh | 385/102 |
| 5,317,664 A | * | 5/1994 | Grabiec et al. | 385/87 |
| 5,615,293 A | * | 3/1997 | Sayegh | 385/102 |
| 6,249,628 B1 | * | 6/2001 | Rutterman et al. | 385/106 |
| 2004/0120665 A1 | * | 6/2004 | Hurley et al. | 385/106 |
| 2006/0093300 A1 | * | 5/2006 | Marrs et al. | 385/134 |
| 2009/0087148 A1 | * | 4/2009 | Bradley et al. | 385/76 |

* cited by examiner

*Primary Examiner*—Brian M Healy
(74) *Attorney, Agent, or Firm*—Peter V. D. Wilde

(57) ABSTRACT

An optical fiber cable suitable for drop cable applications has a dual jacket, dual reinforcement layers, a round cross section, and a tight buffered construction. The optical fiber cable is a compact unitary coupled fiber assembly that has a small profile, and is light in weight, while still sufficiently robust for many indoor/outdoor drop cable installations. The small profile and round construction make the cable easy to connectorize.

8 Claims, 1 Drawing Sheet

OPTICAL FIBER CABLES

RELATED APPLICATION

This application claims priority from U.S. Provisional Application No. 60/975,830 filed Sep. 28, 2007, and U.S. patent application Ser. No. 12/009,477, filed Jan. 18, 2008.

FIELD OF THE INVENTION

This invention relates to optical fiber cables specially adapted for drop line applications.

BACKGROUND OF THE INVENTION

Fiber-to-the-premises (FTTP) from local telephone and cable service providers is rapidly being implemented. This service requires a broadband optical fiber distribution network comprising local optical fiber distribution cables installed in neighborhood and city streets. The local distribution cable is a large fiber count (multi-fiber) cable. Single fiber or few fiber cables are used for the "drop" line from the street to the premises. In many cases, aerial drop lines are used, and these have special requirements. In other cases, cables are buried in earth or installed in conduit. These installations have different requirements.

Most current optical fiber drop cables are "universal", i.e., have a single construction designed for a universe of drop applications. However, as applied to many current applications the universal designs are excessively large, and are difficult to connectorize. An example of a robust optical fiber cable design is shown in FIG. 1, the OFS Mini LT. The cable 11 comprises optical fiber subunit 12, abutted on both sides with strength members 13 and 14. This cable has a design tensile strength of 300 lbs, compliant with the Telcordia GR-20 and ICEA-S-717 standards for Outside Plant optical cables. It is also designed to mimic earlier copper cable versions so that the external cable appearance matches that of existing copper versions, and standard hardware and installation equipment may be used for both. However, for some important drop installations, typically indoor applications, this cable is either overdesigned or underdesigned in the following particulars.

- These cables are rigid and stiff, and difficult to bend or handle. They have a preferred bending axis due to the ribbon shape, making bending difficult in other than the preferred axis.
- The 300 lb. tensile requirement leads to a large cable footprint, typically about 4×8 mm.
- The non-circular cross-section of the cable makes it difficult to manufacture and handle. The non-circular cross section is partly for hardware compatibility in outside installations, which is not relevant to many current applications. A non-circular cross section also makes the cable difficult to connectorize.
- The cable is not flame retardant, and thus not suitable for indoor applications.
- Some optical fiber cables contain gel-filling compounds for preventing water incursion in the cable. Filled cables are not necessary for indoor applications.
- Universal drop cable designs used in aerial installations may be subjected to movement and sag due to wind and ice build-up, and due to mechanical strain caused by differential thermal expansion. Accordingly some universal drop cables commonly have a loose fiber design. In this design the optical fibers are loosely received, "floating" within the cable encasement. Again, this is an overdesign for optical fiber cables used in less hostile environments.

New designs for FTTP drop cable that offer compact size and low cost, and ease in connectorizing, are continually being sought.

STATEMENT OF THE INVENTION

We have designed an optical fiber cable adapted for drop cable applications that has a dual jacket, dual reinforcement layers, a round cross section, and a tight buffered construction. The optical fiber cable of the invention is a unitary compact coupled fiber assembly with a small profile, and is light in weight, while still sufficiently robust for many indoor/outdoor drop cable installations. The small profile and round construction make the cable easy to connectorize.

DETAILED DESCRIPTION

Figure 2:
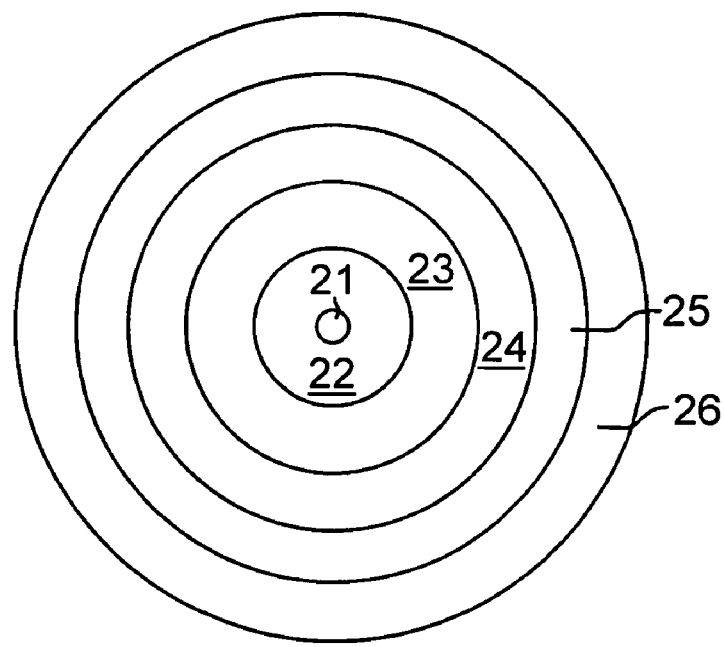
FIG. 2 is sectional view of the optical fiber cable of the invention.

The dual-jacketed, all dielectric, self-supporting cable of the invention is shown in FIG. 2. The design comprises an optical fiber subunit with optical fiber 21, surrounded by a tightly buffered layer 22. The tight buffered optical fiber subunit is a 250 micron fiber buffered up to a diameter of 0.9 mm (buffer layer thickness 650 microns). Other tight buffered optical fiber subunit diameters, typically 0.4 mm to 1.2 mm may be used. This allows termination with piece parts of standard optical connectors. The tight buffer layer completely surrounds and encases the optical fiber, meaning that the buffer layer contacts the optical fiber coating of the optical fiber. The tight buffer layer is a polymer, for example, PVC, nylon, polyolefins, polyester thermoplastic elastomers, fluoropolymers, UV-curable acrylates, or a combination of these materials. While the preferred optical fiber subunit contains a single optical fiber, equivalent cable designs may have optical fiber subunits with 1-3 optical fibers.

Figure 1:
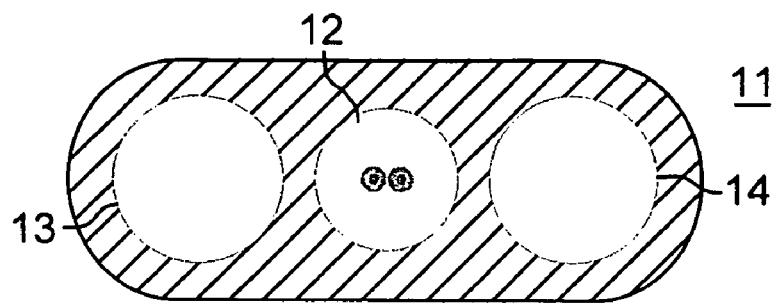
FIG. 1 is a sectional view of a conventional optical cable designed for universal drop cable applications.

A characteristic of the optical fiber cable design of the invention, and one that contrasts with the optical fiber cable of FIG. 1, is that cable strength is provided by two separate strength members that are concentric with the optical fiber subunit. The two concentric strength layers are alternated with two concentric jacket layers.

The inner strength layer 23 in FIG. 2 is a wrap of aramid yarn. This provides reinforcement, and allows an optical connector to be crimped on the inner cordage using industry-standard techniques. For outdoor applications, the aramid yarn may be coated with a waterswellable finish, or the core may be dusted with waterswellable powder, so as to provide waterblocking. Other high strength polymer tapes or yarns may be used. A polymer wrap refers to any polymer tape, yarn, ribbon, or the like, made of high strength polymer material.

The inner jacket 24 is a polymer layer with an outer diameter of less than 3.2 mm, and preferably 2.9 mm, the diameter of industry standard simplex cordage. The combination of the buffered fiber 21, 22, the inner reinforcement layer 23, and the inner jacket 24, produces an optical fiber subcable cordage that in some applications can be separated from the remaining cable for moderate cable spans. For example, the main cable can be routed to a connection area such as a cable closet or enclosure, and the outer layers of the cable stripped leaving only the subcable cordage to be routed to the optical fiber connection point. The OD of the subcable can have a relatively small standard cordage diameter, e.g. 2.5 mm, 2.4 mm, 2.0 mm or 1.6 mm, to reduce both the overall size of the drop cable, and produce a small diameter subcable cordage. Thus a suitable range for the diameter of the subcable cordage is 1.2 mm to 3.2 mm. The inner jacket can advantageously be made flame-retardant when required for indoor, or indoor/outdoor applications. Suitable materials for the inner jacket are PVC, polyolefins such as polyethylene or polypropylene, flame-retardant polyolefins, polyurethanes, or other suitable materials.

The subcable cordage is enclosed in outer reinforcement layer 25, and outer jacket 26. Outer reinforcement layer 25 may be made out of any suitable linear strength member. Aramid yarns are preferred due to low weight and high specific strength (strength per unit area). However, glass yarns, glass rods, and aramid rods, and combinations of these, may also be used. A ripcord may be added so as to provide easy access to the inner jacket. For outdoor applications, water-blocking may be provided, which includes waterswellable coatings on the reinforcements, or waterswellable powders, yarns, or tapes applied to the outer reinforcement layer. Outer jacket 26 may be made of any suitable material for the application. For outdoor applications, polyethylene with carbon black may be used. If low temperature functionality is required, a UV-resistant polyurethane may be deployed. If flame retardancy is required, a PVC, non-halogen flame retardant polyolefin, or fluoropolymer may be used. Resistance to UV degradation or flame retardancy may be incorporated as needed. PVC is a preferred choice for the outer jacket material as it is easy to process, and is a proven material that provides a flexible jacket with some flame retardancy. The thickness of the combination of the outer reinforcement layer and the outer jacket will typically be in the range of 1.5 to 3.0 mm.

As mentioned earlier, a significant characteristic of the optical fiber cable of the invention is a small cable diameter and small cross section area. Even with a relatively complex design, i.e. two reinforcement layers and two jacket layers, the cable can be produced with an overall cable cross section area of less than 25 mm². The preferred cable diameter is 4.5 mm or less.

An important advantage of the optical fiber cable design of the invention is that it is easily terminated with standard connectors. To create factory-terminated 'pigtail' (connector on 1 end) or factory-terminated 'jumper' (connector on both end) cables, the outer jacket and outer reinforcement is stripped back, exposing the inner jacket of the subcable cordage. A length of heat-shrink tubing may then be slipped over the end of the cable, providing a seal for the transition between the outer jacket of the cable and the stripped end of the subcable cordage. The subcable cordage may then be terminated using standard procedures for cordage that will be familiar to those skilled in the art. Connectors that may be used will depend on the specific application. If the connectorized cable is intended for installation indoors, it may be terminated with standard indoor connectors such as SCs, LCs, STs, FCs, MT-RJs or combinations thereof. This list is given by way of example and is not limiting. If the cable is to be installed outdoors, but ends of the cable are to be installed in outdoor distribution frames or terminals that are sealed so as to be weatherproof, standard connectors may be used. Combinations of indoor only, 'shrouded' indoor connectors, and hardened outdoor connectors may be used as appropriate.

As noted earlier, the cross section of the cable is essentially round. However, some degree of ovality can be tolerated. The term "essentially round" is intended to include oval shapes.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. A method for installing a dual-jacketed optical fiber cable where the optical fiber cable comprises:
   (a) a tight buffered optical fiber subunit comprising at least one optical fiber encased in a polymer layer, the optical fiber subunit having an essentially round cross section, and having a diameter of 1.2 mm or less
   (b) an inner reinforcement layer comprising a polymer wrap surrounding the optical fiber subunit,
   (c) an inner jacket comprising a polymer layer surrounding the inner reinforcement layer,
   wherein elements (a), (b) and (c) constitute a subcable cordage,
the optical fiber cable further comprising:
   (d) an outer reinforcement layer applied to the subcable cordage,
   (e) an outer jacket comprising a polymer layer surrounding the outer reinforcement layer,
the method comprising the steps of:
   (1) removing the outer jacket and the outer reinforcing layer of a portion of the cable thereby exposing a portion of the subcable cordage,
   (2) routing the subcable cordage to a connection point,
   (3) attaching a connector to the subcable cordage.

2. The method of claim 1 wherein the portion the outer jacket and the outer reinforcing layer is removed using a rip cord in the reinforcing layer.

3. The method of claim 1 wherein the connector attached to the subcable cordage is a connector selected from the group consisting of SC connectors, LC connectors, ST connectors, FC connectors, and MT-RJ connectors.

4. The method of claim 1 wherein the diameter of the cordage subcable is 3.2 mm or less.

5. A method for installing a dual-jacketed optical fiber cable wherein the optical fiber cable has a cross section area of less than 25 mm and comprises:
   (a) a tight buffered optical fiber subunit comprising at least one optical fiber encased in a polymer layer, the optical fiber subunit having an essentially round cross section,
   (b) an inner reinforcement layer comprising a polymer wrap surrounding the optical fiber subunit,
   (c) an inner jacket comprising a polymer layer surrounding the inner reinforcement layer,
   wherein elements (a), (b) and (c) constitute a subcable cordage,
the optical fiber cable further comprising:
   (d) an outer reinforcement layer applied to the subcable cordage,
   (e) an outer jacket comprising a polymer layer surrounding the outer reinforcement layer,
the method comprising the steps of:
   (1) removing the outer jacket and the outer reinforcing layer of a portion of the cable thereby exposing a portion of the subcable cordage, (2) routing the subcable cordage to a connection point,
(3) attaching a connector to the subcable cordage.

6. The method of claim 1 wherein the polymer in the inner jacket is provided with a flame retardant.

7. The method of claim 6 wherein the outer jacket is provided with a waterblocking agent.

8. The method of claim 1 wherein heat-shrink tubing is provided over the cable, thereby providing a seal for the exposed portion of the subcable cordage.

* * * * *